United States Patent [19]
Watanabe

[11] Patent Number: 5,394,387
[45] Date of Patent: Feb. 28, 1995

[54] INFORMATION RECORDING/REPRODUCING METHOD

[75] Inventor: Yoshihiko Watanabe, Yokohama, Japan

[73] Assignee: Canon Kabushiki Kaisha, Tokyo, Japan

[21] Appl. No.: 921,640

[22] Filed: Jul. 30, 1992

[30] Foreign Application Priority Data

Aug. 2, 1991 [JP] Japan .................. 3-194112

[51] Int. Cl.⁶ .............................................. H04N 5/76
[52] U.S. Cl. ...................... 369/111; 369/47; 369/48; 369/58; 369/273
[58] Field of Search .................. 369/111, 275.3, 275.4, 369/32, 47, 48, 54, 58, 50

[56] References Cited

U.S. PATENT DOCUMENTS

| | | | |
|---|---|---|---|
| 4,084,185 | 4/1978 | de Lang et al. | 369/111 |
| 4,819,218 | 4/1989 | Barnard | 369/50 |
| 4,896,311 | 1/1990 | Ishihara | 369/47 |

FOREIGN PATENT DOCUMENTS

| | | |
|---|---|---|
| 0080256 | 6/1982 | European Pat. Off. |
| 0137855 | 4/1985 | European Pat. Off. |
| 0238194 | 9/1987 | European Pat. Off. |
| 0399852 | 11/1990 | European Pat. Off. |
| 2136192 | 9/1984 | United Kingdom . |
| WO8001328 | 6/1980 | WIPO . |
| WO8801786 | 3/1988 | WIPO . |
| WO8804824 | 6/1988 | WIPO . |
| WO9111003 | 7/1991 | WIPO . |

*Primary Examiner*—Paul M. Dzierzynski
*Assistant Examiner*—Kiet T. Nguyen
*Attorney, Agent, or Firm*—Fitzpatrick, Cella, Harper & Scinto

[57] ABSTRACT

An information recording/reproducing method in which a recording area is divided into a plurality of zones in the radial direction of a disk so that the lengths of recording pits become the same in the entire recording area of the disk and the recording/reproduction of information is effected with the number of revolutions of the disk changed in each zone from the inner peripheral zone toward the outer peripheral zone. The method includes the step of effecting the recording or reproduction of the information without changing the number of revolutions if the amount of information to be recorded or reproduced is equal to or smaller than a predetermined amount when seeking is effected from a zone in which a recording/reproducing head is in a standby state to a different zone to effect the recording or reproduction.

17 Claims, 11 Drawing Sheets

FIG. 6

CONDITION : AVERAGE SEEKING TIME ------------------------ 30mS
TIME SPENT FOR REVVING UP ------------------ 100mS
TIME SPENT FOR REVVING DOWN ---------------- 100mS
B ZONE FIVE BLOCKS TRANSFERRING RATE2400rpm  1.2MByte/s
(B ZONE FIVE BLOCKS TRANSFERRING RATE3000rpm  1.5MByte/s)

| AVERAGE ACCESS TIME | RECORDING/REPRODUCING TIME AT 2400rpm |
|---|---|
|  |  |
| TIME SPENT FOR REVVING UP | RECORDING/REPRODUCING TIME AT 3000rpm |

NOTE : A PREDETERMINED AMOUNT OF RECORDING/
REPRODUCTION IS 420K Byte IN THE ABOVE EXAMPLE.

INFORMATION RECORDING/REPRODUCING METHOD

BACKGROUND OF THE INVENTION

1. Field of the Invention

This invention relates to an information recording-/reproducing method of effecting the recording and/or reproduction of information on a disk-like recording medium, and particularly to an information recording-/reproducing method in which the recording area of a recording medium is divided into a plurality of zones in the radial direction of the recording medium and the recording/reproduction of information is effected with the rotational speed of the disk made to be different in each zone, whereby the spatial record length of a recording pit is made constant over the entire recording area.

2. Related Background Art

Information recording/reproducing methods of recording/reproducing information on a disk-like recording medium (hereinafter referred to as the disk) include a magnetic recording/reproducing method directed to a floppy disk and an optical information recording/reproducing method directed to a CD or a magneto-optical disk.

The diameter of disks used in these methods is prescribed as 5.25 or 3 inches, and the recent technical task is how densely information can be recorded on disks of such a diameter.

Various information recording/reproducing methods have heretofore been devised to solve such a task and above all, attention has been paid to a method called MCAV (modified constant angular velocity) or ZCAV (zone constant angular velocity). According to this method, the recording area on the disk is divided into a plurality of zones in the radial direction of the disk, and the recording/reproducing frequency of each zone is made higher from the inner peripheral zone toward the outer peripheral zone, thereby making the recording density on the inner and outer peripheries of the recording area constant. According to this method, as compared with the conventional method of effecting recording/reproduction with the number of revolutions and the recording/reproducing frequency kept constant, there is obtained an about 50% increase in recording capacity.

Another method to which attention has been paid is a method called MCLV (modified constant linear velocity) or ZCLV (zone constant linear velocity) in which the recording area on the disk is divided into a plurality of zones in the radial direction of the disk and the number of revolutions of the disk in the respective zones is made lower from the inner peripheral zone toward the outer peripheral zone, thereby making the recording density on the inner and outer peripheries of the recording area constant. Again by this method, as compared with the conventional CAV method, there is obtained an about 50% increase in capacity.

In the former method, however, the linear velocity of the disk is increased toward the outer periphery of the disk and this leads to a problem that the transfer speed of reproduced data is varied by the reproducing position of the disk, and the usability of the device as an information recording/reproducing apparatus is poor. Also, a reproducing signal processing system must accomodate the transfer speed of the outermost peripheral data, and if such a signal processing system does this, it can waste the inner peripheral portion of the disk.

Also, in the latter method, the transfer speed of reproduced data is constant in the inner and outer peripheries of the disk, but when the seeking of a recording/reproducing head is performed beyond a zone, a long time is taken until the number of revolutions of a spindle motor for rotating the disk becomes equal to the number of revolutions of the corresponding zone, and this has led to a problem that the seeking time becomes long.

SUMMARY OF THE INVENTION

The present invention has been made in view of the above-noted problems and has as its object the provision of an information recording/reproducing method in which the recording density is made constant on the inner and outer peripheral portions of a disk to thereby increase the recording density, the transfer speed of reproduced data is constant in the inner and outer peripheral portions of the disk, and a long seeking time is not required.

To achieve the above object, an information recording/reproducing method according to the present invention is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting the recording or reproduction of the information without changing the number of revolutions if the amount of information to be recorded or reproduced is equal to or smaller than a predetermined amount when seeking is effected from a zone in which a recording/reproducing head is on standby to a different zone to effect the recording or reproduction.

Also, an information recording/reproducing method is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting, when a zone in which the frequency of recording or reproduction exceeds a predetermined value is created in a series of recording or reproducing operations, the next recording or reproduction at a number of revolutions corresponding to that zone.

Also, an information recording/reproducing method is provided in which a recording area is divided into a plurality of zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises the step of effecting, when a zone in which recording or reproduction is effected and continues a predetermined or greater number of times, the next recording or reproduction at a number of revolutions corresponding to that zone.

Also, an information recording/reproducing method is provided in which a recording area is divided into a plurality of zones in the radial direction of a disk so that the lengths of recording pits may become the same in the entire recording area of the disk and the recording-/reproduction of information is effected with the number of revolutions of the disk changed in each zone from the inner peripheral zone toward the outer peripheral zone. The method comprises the steps of dividing the recording area into a plurality of partitions including a plurality of zones, and changing, after one cycle of recording or reproduction is completed when the recording or reproduction of continuous information is effected in one of the partitions, the number of revolutions to a number of revolutions corresponding to the outermost peripheral zone in that partition.

Also, an information recording/reproducing method is provided in which a recording area is divided into a plurality of zones in the radial direction of a disk so that the lengths of recording pits may become the same in the entire recording area of the disk and the recording-/reproduction of information is effected with the number of revolutions of the disk changed in each zone from the inner peripheral zone toward the outer peripheral zone. The method comprises the step of recording, when said recording area is divided into a plurality of partitions including a plurality of zones, the managed information of each partition in the innermost peripheral zone in said partition, and effecting the recording or reproduction of the information without changing the number of revolutions between the zone having the managed information recorded therein and the other zones when recording or reproduction in the partition is effected.

Also, an information recording/reproducing method is provided in which a recording area is divided into a plurality of zones in the radial direction of a disk so that the lengths of recording pits may become the same in the entire recording area of the disk and the recording-/reproduction of information is effected with the number of revolutions of the disk changed in each zone from the inner peripheral zone toward the outer peripheral zone. The method comprises the steps of effecting the recording or reproduction of the information without changing the number of revolutions and also waiting at that number of revolutions after the termination of the recording or reproduction if the amount of information to be recorded or reproduced is equal to or smaller than a predetermined amount when seeking is effected from a zone in which a recording/reproducing head is on standby to the inner peripheral zone to effect the recording or reproduction, effecting the recording or reproduction of the information at the number of revolutions if the amount of information to be recorded or reproduced is equal to or smaller than the predetermined amount when the next recording or reproduction is effected in the same zone, and effecting the recording or reproduction of the information with the number of revolutions changed to a number of revolution corresponding to that zone if the amount of information is greater than the predetermined amount.

An information recording/reproducing method is provided in which a recording area is divided into a plurality of zones and a plurality of partitions including the zones in the radial direction of a disk so that the lengths of recording pits may become the same in the entire recording area of the disk and the recording/reproduction of information is effected with the number of revolutions of the disk changed in each zone from the inner peripheral zone toward the outer peripheral zone. The method comprises a first control step including the following operations:

(1) effecting the recording or reproduction of the information without changing the number of revolutions if the amount of information to be recorded or reproduced is equal to or smaller than a predetermined amount when seeking is effected from a zone in which a recording/reproducing head is on standby to the inner peripheral zone to effect recording or reproduction, effecting the recording or reproduction of the information with the number of revolutions increased to a number of revolutions corresponding to the zone to be sought if the amount of information to be recorded or reproduced is greater than the predetermined amount, and waiting for the next recording or reproduction at the number of revolutions during recording or reproduction after the termination of a series of recording or reproducing operations;

(2) effecting recording or reproduction without changing the previous number of revolutions when the recording or reproducing operation is to be performed in the zone wherein the recording/reproducing head is on standby, and waiting for the next recording or reproduction at the number of revolutions during recording or reproduction after the termination of a series of recording or reproducing operations;

(3) effecting the recording or reproduction of the information with the number of revolutions decreased to a number of revolutions corresponding to the zone to be sought when seeking is effected from the zone in which the recording/reproducing head is on standby to the outer peripheral zone to effect recording or reproduction, and waiting for the next recording or reproduction at the number of revolutions during recording or reproduction after the termination of the series of recording or reproducing operations;

a second control step including the following operations:

first, adopting the number of revolutions for the outermost peripheral zone in the partition wherein the reproducing head lies now;

(1) effecting the reproduction of the information without changing the number of revolutions if the amount of information to be reproduced is equal to or smaller than a predetermined amount when seeking is effected from a zone in the partition wherein the reproducing head is on standby to a different zone to effect reproduction, effecting the reproduction of the information with the number of revolutions increased to a number of revolutions corresponding to the zone to be sought if the amount of information to be reproduced is greater than the predetermined amount, and waiting for the next reproduction with the number of revolutions decreased to a number of revolutions corresponding to the outermost peripheral zone in the partition after the termination of a series of reproducing operations;

(2) effecting the reproduction of the information without changing the number of revolutions if the amount of information to be reproduced is equal to or smaller than a predetermined amount when the reproducing operation is performed in the zone wherein the reproducing head is on standby, effecting the reproduction of the information with the number of revolutions increased to a number of revolutions corresponding to the zone if the amount of information to be reproduced is greater than the predetermined amount, and waiting for the next reproduction with the number of revolutions decreased to a number of revolutions corresponding to the outermost peripheral zone in the partition after the termination of a series of reproducing operations;

(3) effecting the reproducing operation without changing the number of revolutions when seeking is effected from the zone in which the reproducing head is on standby to the outer peripheral zone to effect reproduction, and waiting for the next reproduction at a number of revolutions corresponding to the outermost peripheral zone in the partition after the termination of the series of reproducing operations; and the step of changing over said first control step and said second control step in conformity with the situation.

BRIEF DESCRIPTION OF THE DRAWINGS

FIG. 6 is a chart for illustrating a predetermined amount of information in the present invention.

DESCRIPTION OF THE PREFERRED EMBODIMENTS

The details of the present invention will hereinafter be described with reference to the drawings.

Figure 1:
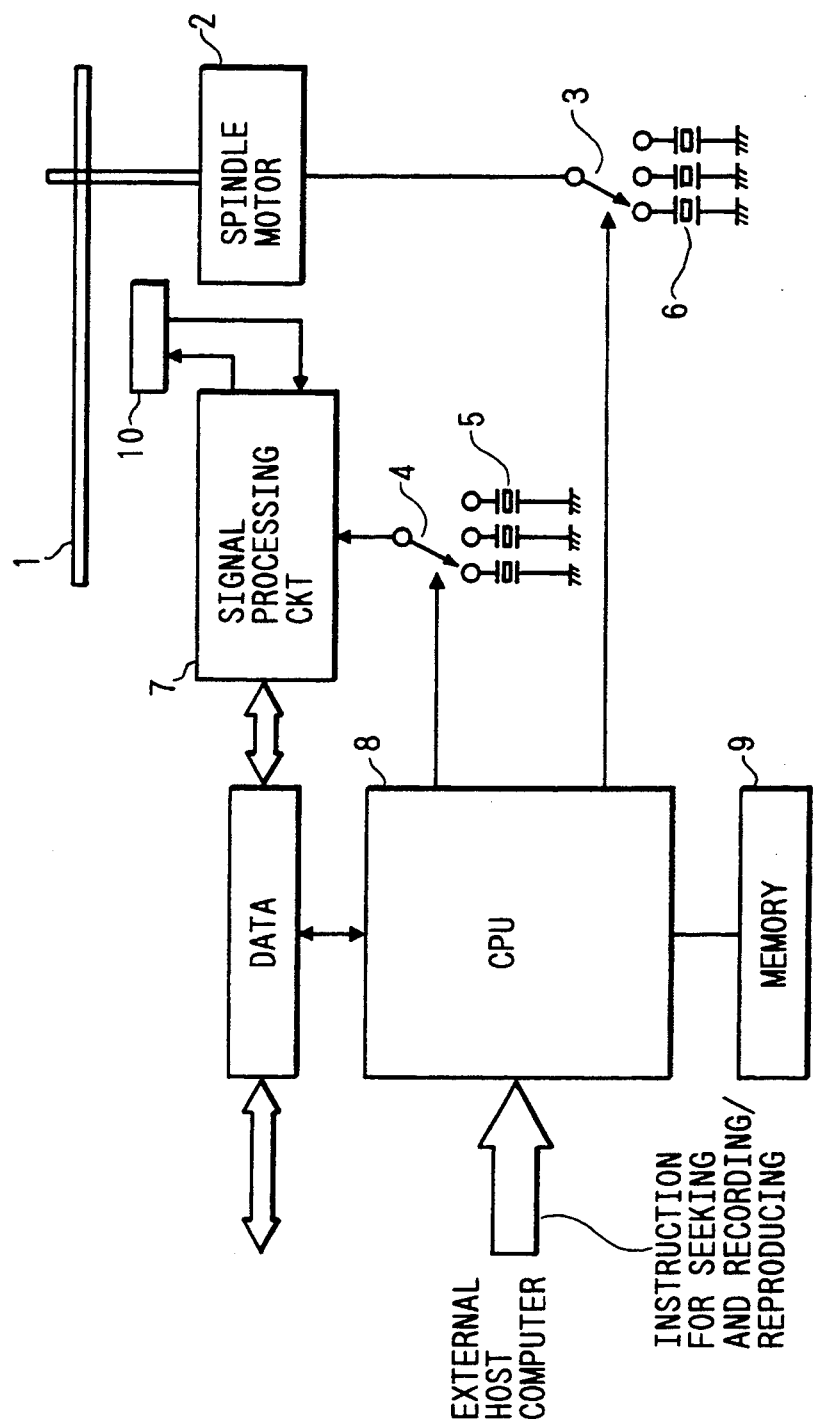
FIG. 1 is a block diagram showing an information recording/reproducing apparatus for carrying out the information recording/reproducing method of the present invention.

FIG. 1 is a block diagram showing an embodiment of an information recording/reproducing apparatus for carrying out the information recording/reproducing method of the present invention. In FIG. 1, the reference numeral 1 designates a disk-like information recording medium having concentric or spiral tracks formed in a recording area provided on the surface thereof. The reference numeral 2 denotes a spindle motor for rotating the disk 1, the reference numeral 3 designates a number-of-revolutions changing switch for selectively changing the number of revolutions of the spindle motor 2, the reference numeral 4 denotes a signal processing speed changing switch for selectively changing the processing speed of a signal processing circuit, the reference numeral 5 designates signal processing frequency setting means for setting the signal processing speed, i.e., the signal processing frequency, of the signal processing circuit selected by the signal processing speed changing switch 4, the reference numeral 6 denotes a rotation frequency setting circuit for determining the number of revolutions selected by the number-of-revolutions changing switch 3, the reference numeral 7 designates a signal processing circuit for processing a recording/reproducing signal sent to or obtained from a recording/reproducing head, and the reference numeral 8 denotes a CPU for controlling the number-of-revolutions changing switch 3 and the signal processing speed changing switch 4. The CPU 8 executes the seeking of an outside host computer (the seeking herein referred to is the seeking of the recording/reproducing head and will hereinafter be simply referred to as the seeking), the control of the number-of-revolutions changing switch 3 and the signal processing speed changing switch 4 on the basis of the seeking and a command for recording or reproduction, and determination based on a flow chart which will hereinafter be described. The reference numeral 9 designates a memory connected to the CPU 8, and the reference numeral 10 denotes the recording/reproducing head.

On the basis of the above-described construction, description will now be provided of the operation in each embodiment of the present invention.

In the present invention, as shown in Table 1, the tracks in the recording area of the recording medium are divided in advance into zones logically in the unit of plural tracks in the radial direction of the recording medium, and in each zone, the recording/reproducing operation is effected at a predetermined number of recording revolutions. Also, the number of revolutions of the recording medium differs from zone to zone, and becomes higher toward the inner periphery of the recording medium. At this time, the recording/reproducing frequency (specifically, the frequency of a clock signal which takes the modulation timing of recorded data and the demodulation timing of reproduced data) is the same among the zones. Thus, the lengths of recording pits are the same (constant in recording density) in the entire recording area of the disk. The present invention is based on the so-called MCLV recording/reproducing system.

A first embodiment of the present invention will hereinafter be described with reference to a flow chart shown in FIG. 2.

When an instruction for seeking and recording/reproducing comes from the outside host computer to the CPU 8, the CPU 8 determines whether the instruction is for the seeking to the inner peripheral zone of the disk or not (the same zone or the outer peripheral zone). If the instruction is for the seeking to the inner peripheral zone, the CPU 8 then determines whether the amount of information to be recorded/reproduced exceeds a predetermined amount.

Here, the predetermined amount is the amount of information to be recorded or reproduced when the total of the time during which the number of revolutions is varied to a number of revolutions corresponding to the zone to be sought and the time required for recording or reproducing at the varied number of revolutions coincides with the total of the average seeking time and the time required for recording or reproducing at the number of revolutions for the previous zone, and is prescribed by the following equation (1):

$$B = R_T(T_R - T_A)\{R_1/(R_2 - R_1)\} \qquad (1),$$

where $T_A$ is the average seeking time, $T_R$ is the time required for revving up the number of revolutions, B is the amount of information to be recorded/reproduced (the number of bytes), $R_T$ is a recording/reproducing transfer rate corresponding to a predetermined zone, $R_1$ is the present number of revolutions, and $R_2$ is a number of revolutions corresponding to the zone to be sought.

In an example shown in FIG. 6, from the above equation (1), the predetermined amount is 420 K byte. When 420 K byte is exceeded, it will shorten the whole processing time to rev up the number of revolutions to a number of revolutions corresponding to the zone to be sought and effect recording/reproduction.

For the reason set forth above, if the amount of information to be recorded/reproduced is equal to or greater than the predetermined amount, the switch 3 is controlled to rev up the number of revolutions of the spindle motor 2 to the number of revolutions corresponding to the zone to be sought and at the same time, seeking is executed and recording/reproduction is effected. Thereafter, there is brought about a state in which the spindle motor waits for an instruction at that number of revolutions. If the amount of information is smaller than the predetermined amount, seeking is effected without changing the number of revolutions of the spindle motor 2 and the switch 4 is controlled to change the recording/reproducing frequency of the signal processing circuit 7 so that even if in the zone to be sought, recording/reproduction is effected at that number of revolutions, the length of recording pit in that zone may be the same as the length of recording pit in the other zones, and recording/reproduction is effected. Thereafter, there is brought about a state in which the spindle motor waits for an instruction at that number of revolutions.

When seeking is to be effected in the same zone and recording/reproduction is to be effected, the number of revolutions of the spindle motor 2 and the recording/reproducing frequency of the signal processing circuit are not changed. Also, when seeking is to be effected in the outer peripheral zone and recording/reproduction is to be effected, the switch 3 is controlled to change the number of revolutions of the spindle motor 2 to the number of revolutions for the corresponding zone, and the recording/reproducing frequency of the signal processing circuit is not changed.

Figure 7:
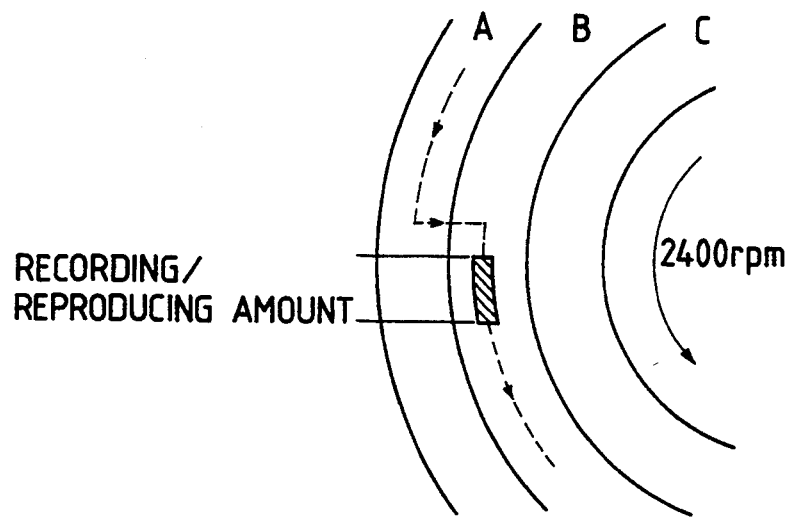
FIG. 7 is a schematic view showing the first embodiment of the present invention.

FIG. 7 is a schematic view showing the operation when the amount of information is smaller than the predetermined amount, and although when the spindle motor is rotating at 2400 rpm in a zone A, there has come an instruction to seek to the inner peripheral zone B and effect recording/reproduction, the number of revolutions should originally become 3000 rpm in the zone B because the amount of information is smaller than the predetermined amount, but yet recording/reproduction is effected at 2400 rpm.

Figure 8:
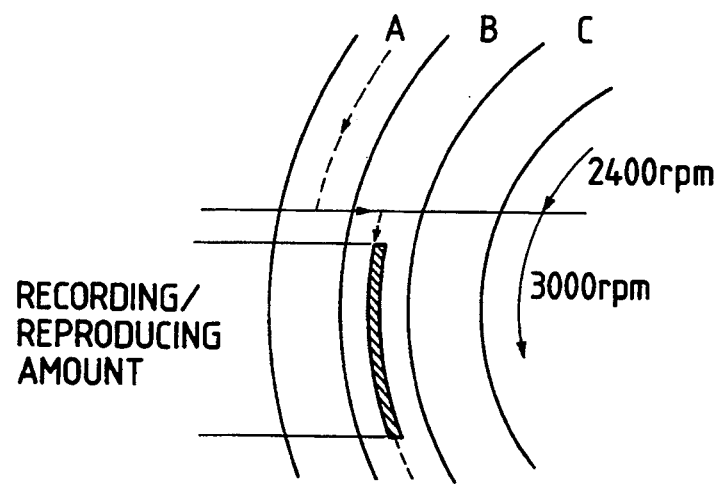
FIG. 8 is a schematic view showing the first embodiment of the present invention.

FIG. 8 is a schematic view showing the operation when the amount of information is equal to or greater than the predetermined amount, and simultaneously with seeking, the number of revolutions of the spindle motor is revved up to 3000 rpm which is the number of revolutions for the zone B, and recording/reproduction is effected. According to the present invention, even if the recording/reproduction of a small amount of information frequently takes place from a zone corresponding to the number of revolutions at the starting point of time to the inner peripheral zone, the number of revolutions is not changed each time and therefore, the seeking time can be shortened and thus, the recording/reproducing process time can be shortened.

Figure 3:
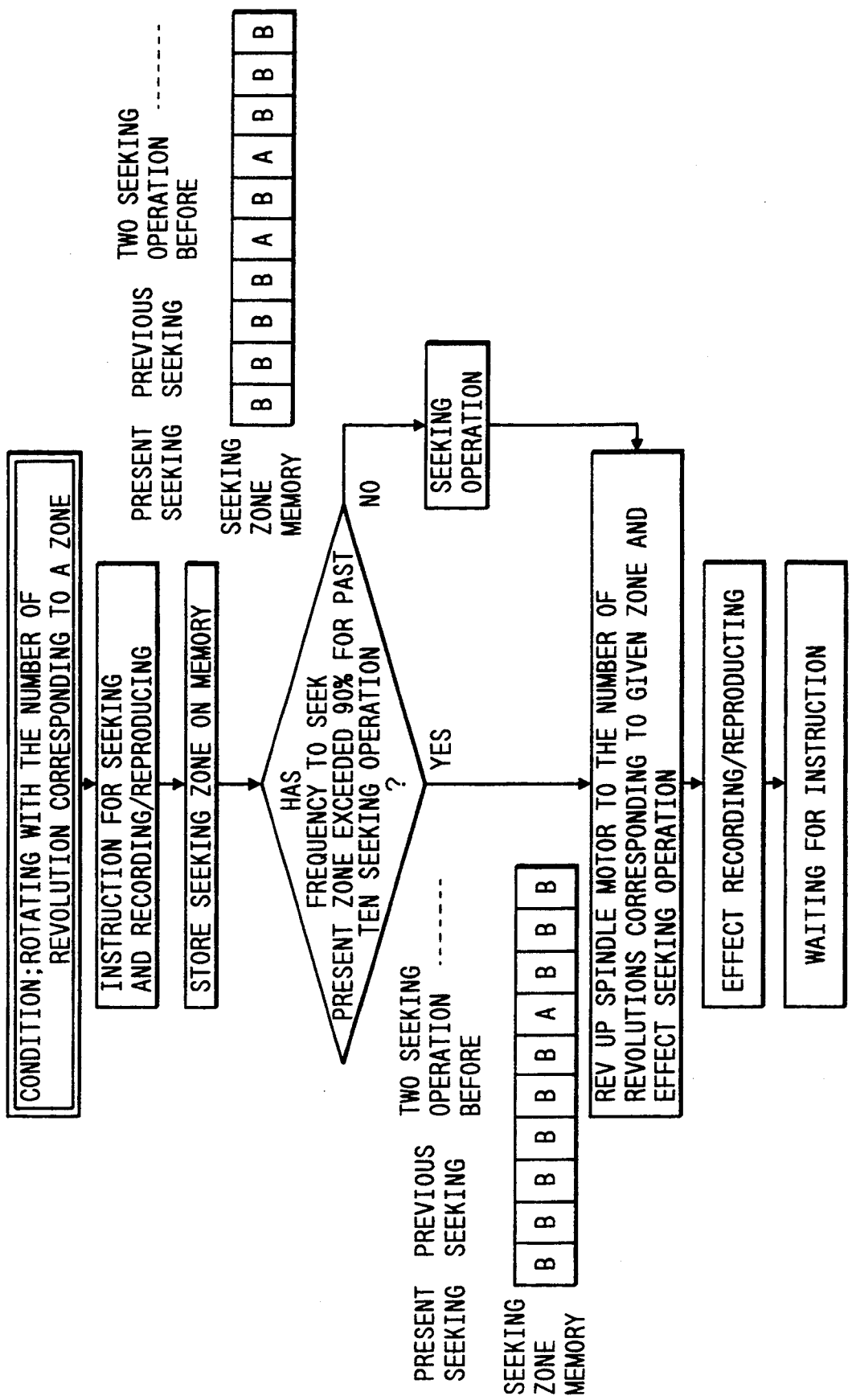
FIG. 3 is a flow chart showing a second embodiment of the present invention.
Figure 9:
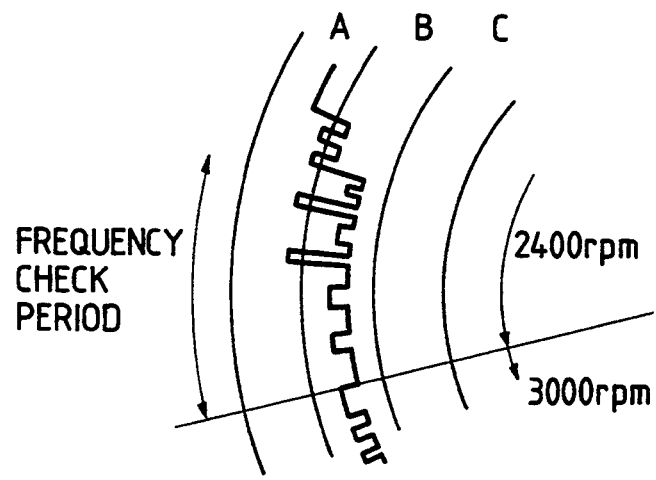
FIG. 9 is a schematic view showing the second embodiment of the present invention.

A second embodiment of the present invention will now be described with reference to the flow chart of FIG. 3 and the schematic view of FIG. 9. The number of revolutions of the spindle motor 2 at the starting point of time will be described with respect to a case where the spindle motor is rotating at a number of revolutions 2400 rpm corresponding to the zone A in Table 1. The operation of the present embodiment follows the operation of the aforedescribed first embodiment.

An instruction for seeking and recording/reproducing comes from the outside host computer to the CPU 8 and which zone should be sought is stored in the memory 9. The recording/reproducing head is in the zone A at first and has sought the zone B, closer to the inner periphery of the disk than the zone A, but the amount of information to be recorded/reproduced is smaller than the predetermined amount (the amount of information defined by the aforementioned equation (1)) and therefore, recording/reproduction is executed still at 2400 rpm. Thereafter, which zone has been sought is stored in the memory 9 each time seeking is effected, so that the history of the zones which have been sought ten times in the past can be known. In the case of FIGS. 3 and 9, an instruction for seeking and recording/reproducing finally comes from the state of B.B.B.B.B.A.B.B.B.A. (present→past), and by an instruction for seeking to the zone B, there is brought about the state of B.B.B.B.B.A.B.B.B. (present→past), and the frequency of the seeking to the zone B exceeds 90%. That is, the frequency with which seeking and recording/reproduction are executed in the zone B exhibits a high probability, and the adoption of 3000 rpm corresponding to the zone B results in better recording/reproducing process efficiency in terms of time. Accordingly, when the CPU 8 judges that fact in accordance with the content of the memory, the number of revolutions of the spindle motor 2 is revved up to 3000 rpm after the recording/reproducing process when so judged is terminated, and the next instruction is waited for.

Figure 10:
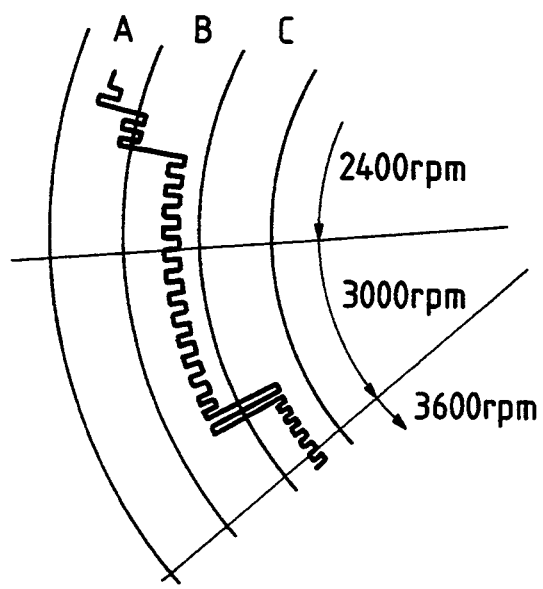
FIG. 10 is a schematic view showing the third embodiment of the present invention.

A third embodiment of the present invention will now be described with reference to the flow chart of FIG. 4 and the schematic view of FIG. 10.

Figure 4:
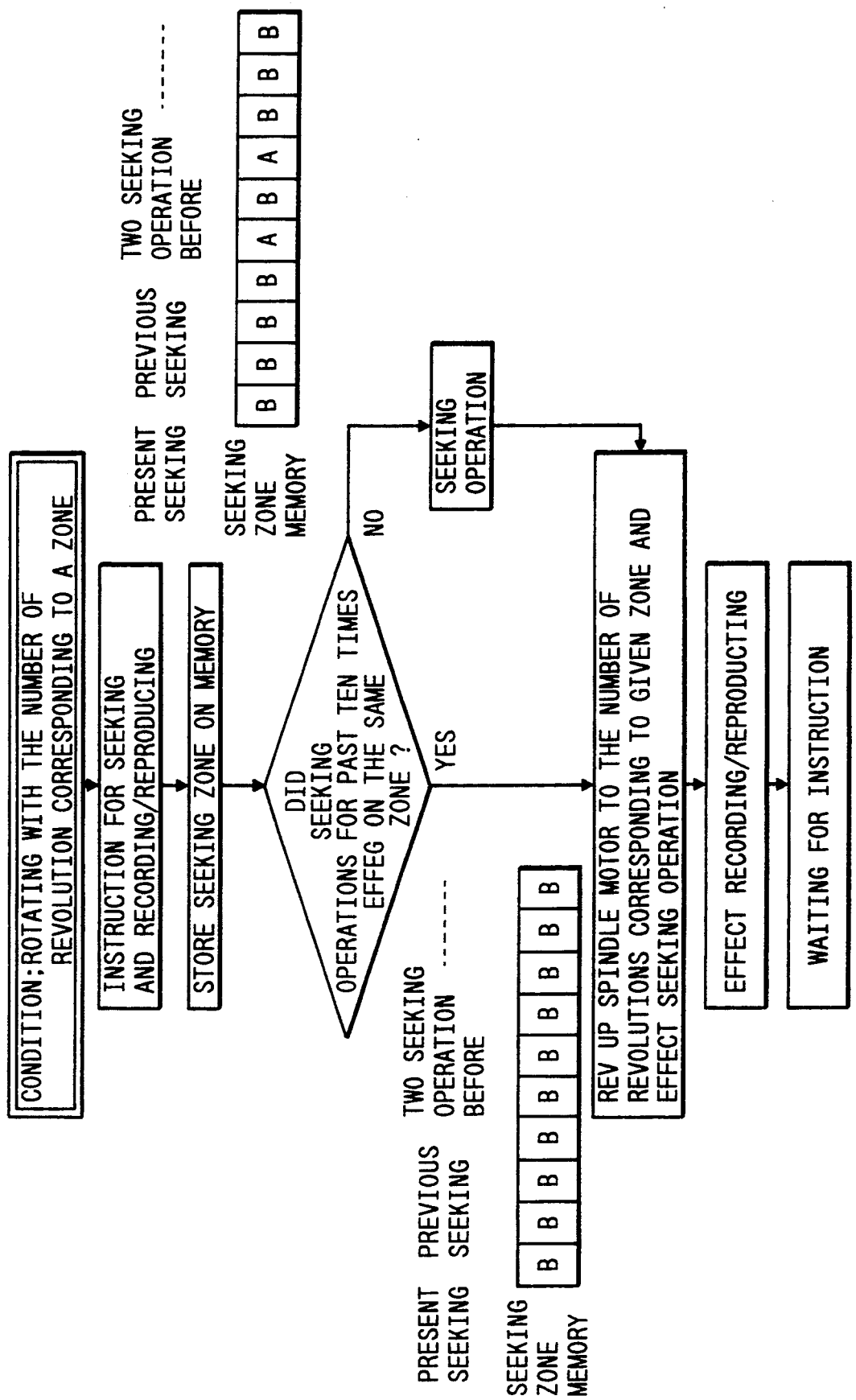
FIG. 4 is a flow chart showing a third embodiment of the present invention.

In the previous embodiment, the frequency of zone seeking has been calculated from the history of the past zone seeking, and on the basis of the result thereof, the number of revolutions has been adjusted, but a simpler algorithm is shown in FIG. 4. The difference of the present embodiment from the previous embodiment is that whether the same zone has been sought ten times in the past and recording/reproduction is effected is determined and if the same zone has been sought ten times in the past and recording/reproduction is effected, the number of revolutions of the spindle motor 2 is revved up to the number of revolutions for that zone.

The present embodiment is simpler in control than the previous embodiment.

The previous embodiment will be sufficiently effective even if seeking is effected only for the recording/reproduction of an amount of information smaller than the predetermined amount of information.

Figure 11:
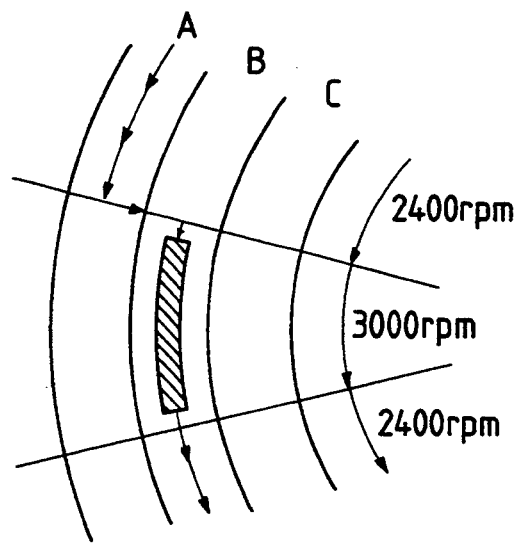
FIG. 11 is a schematic view showing the fourth embodiment of the present invention.

A fourth embodiment of the present invention will now be described with reference to the flow chart of FIG. 5 and the schematic view of FIG. 11.

In the previous embodiment, when the amount of information to be recorded/reproduced is equal to or greater than the predetermined amount, the number of revolutions has been revved up and recording/reproduction has been executed, whereafter there has been brought about the state in which the instruction is waited for, but when the instruction coming next time instructs the seeking of the outer peripheral zone and recording/reproduction is effected, it has been necessary that the number of revolutions of the spindle motor 2 be revved down without fail to the number of revolutions for a corresponding zone.

The reason for this will hereinafter be described. In the MCLV system, this premises that over the entire recording area, recording/reproduction is effected at substantially the same recording/reproducing frequency, but the recording/reproducing frequency set for that purpose is usually heightened as much as possible in practice to enhance the transferring rate. As previously described, when without the number of revolutions of the spindle motor 2 being changed, seeking is to be effected from the zone in which the head is at present to the inner peripheral zone and recording/reproduction is to be effected, the recording/reproducing frequency must be changed, but in such case, the number of revolutions is higher for the inner peripheral side zones and thus, the recording/reproducing frequency is made lower than the recording/reproducing frequency when recording/reproduction is effected at the number of revolutions for a corresponding zone. However, when the outer peripheral zone is to be sought and recording/reproduction is to be effected, an attempt to effect recording/reproduction at the number of revolutions before seeking without the number of revolutions of the spindle motor 2 being revved down to the number of revolutions for a corresponding zone makes it necessary to heighten the recording/reproducing frequency. In such case, as previously described, the recording/reproducing frequency when recording/reproduction is effected at the number of revolutions corresponding to that zone is heightened as much as possible in practice, and it is possible in performance to reduce the frequency below it, but it is unreasonable in performance to heighten the recording/reproducing frequency above it. Therefore, when the outer peripheral zone is to be sought and recording/reproduction is to be effected, the number of revolutions of the spindle motor 2 must be revved down without fail to the number of revolutions corresponding to the zone to be sought.

The present embodiment shortens the processing time to the utmost when the outer peripheral zone is sought and recording/reproduction is effected.

The recording area on the disk is first divided into a plurality of partitions, and then the head is moved to the outermost peripheral zone in one of the partitions to effect a continuous recording/reproducing process. The spindle motor 2 is then rotated at a number of revolutions corresponding to the outermost peripheral zone in that partition (the partition referred to here is the recording area logically divided to efficiently manage the information on the recording medium, and includes a plurality of zones). According to FIG. 11, the spindle motor starts at 2400 rpm, the number of revolutions corresponding to the outermost peripheral zone A in the partition consisting of zones A, B and C. Next, when there is an instruction for seeking and recording/reproducing, whether the position to be sought is the outermost peripheral zone in the partition is determined. If it is the outermost peripheral zone, the instruction is executed without the number of revolutions being changed. If the position to be sought is any other zone than the outermost peripheral zone, whether the amount of information to be recorded/reproduced next is equal to or greater than the predetermined amount (the amount of information prescribed by the aforementioned equation (1)) is determined. If the amount of information to be recorded/reproduced is smaller than the predetermined amount, the instruction is also executed without the number of revolutions being changed. If the amount of information to be recorded/reproduced is equal to or greater than the predetermined amount, the number of revolutions is revved up to a number of revolutions corresponding to the zone to be sought and the instruction is executed. Thereafter, the number of revolutions of the spindle motor 2 is restored to 2400 rpm, the number of revolutions corresponding to the outermost peripheral zone in the partition, and an instruction is waited for in the zone wherein recording/reproduction has been effected.

In the present embodiment, after the process in a zone or a series of processes are terminated, the number of revolutions of the spindle motor is restored to the number of revolutions corresponding to the outermost peripheral zone in the partition and therefore, even if the next instruction is for seeking to a zone in the outer peripheral direction, it is unnecessary to change the number of revolutions and simply by changing the recording/reproducing frequency (but only in the partition), the instruction can be executed. As a result, when seeking is effected of a zone in the outer peripheral direction and recording/reproduction is effected, the processing time can also be shortened to the utmost.

Also, in the present embodiment, the design may be made such that after the execution of the instruction, a return operation is performed to a predetermined position (which is set arbitrarily) in the outermost peripheral zone in the partition and an instruction is waited for. In such case, however, the predetermined amount may be the amount of information to be recorded or reproduced when the total of the time during which the number of revolutions is changed to the number of revolutions corresponding to the zone to be sought, the time required for recording or reproducing at the changed number of revolutions and the time during which the number of revolutions is revved down to the number of revolutions corresponding to the outermost peripheral zone in the partition coincides with the total of the time required for seeking (a time double the average seeking time) and the time required for recording or reproducing at the number of revolutions for the previous zone. It is prescribed by the following equation (2):

$$B = 2R_T(T_R - T_A)\{R_1/(R_2 - R_1)\}, \qquad (2)$$

where $T_A$ is the average seeking time, $T_R$ is the time required for revving up the number of revolutions, B is the amount of information to be recorded/reproduced (byte number), $R_T$ is the recording/reproducing transferring rate corresponding to a given zone, $R_1$ is the present number of revolutions, and $R_2$ is the number of revolutions corresponding to the zone to be sought.

In the present embodiment, when an amount of information equal to or greater than the predetermined amount is to be continuously recorded/reproduced, the number of revolutions of the disk need not be changed to the number of revolution corresponding to the outermost peripheral zone in the partition even after a recording/reproducing process is terminated.

A fifth embodiment of the present invention will now be described.

In a magneto-optical disk or the like, where the recording area is divided into partitions, FAT in each partition and information managing regions such as directory, directory entry and defect table exist and these are distinguished from the recording area used by the user.

Figure 12:
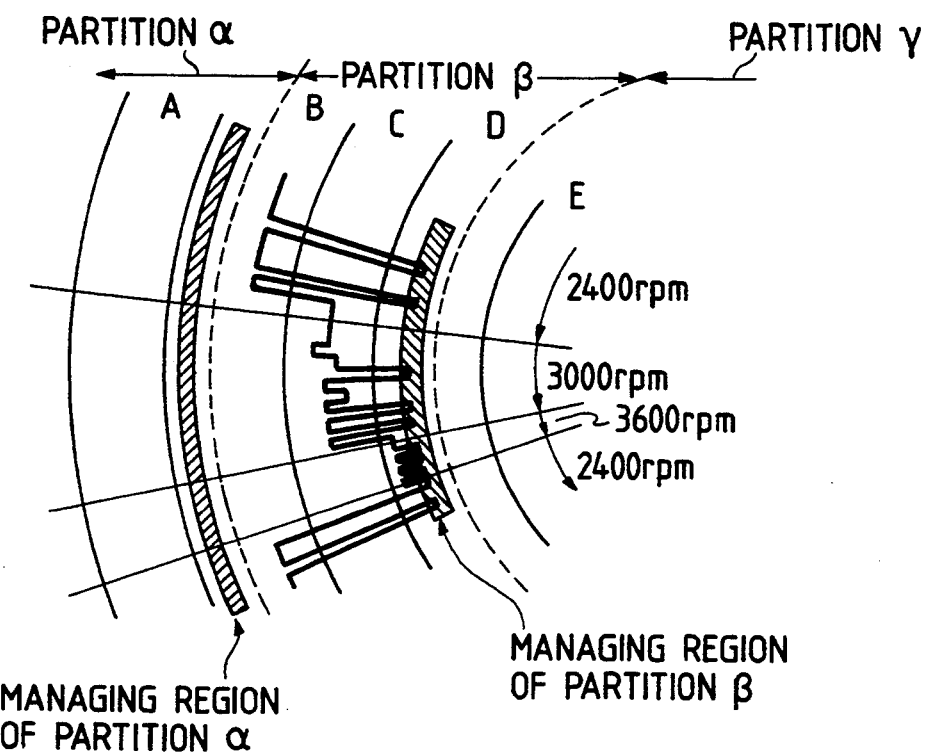
FIG. 12 is a schematic view showing a fifth embodiment of the present invention.

The frequency of the seeking of the head to the information managing regions is high. In the present invention, as shown in FIG. 12, in a partition α (a portion of zone A and zone B), the information managing region of that partition is placed in the zone B, and in a partition β (a portion of zone B, zone C and zone D), the information managing regions is placed in the zone D.

By providing the information managing region in the outermost periphery in each partition like this, even if the number of revolutions is not changed, it is made possible to carry out the recording/reproducing process in the information managing region by only changing the recording/reproducing frequency, and the processing time is shortened.

Also, the present embodiment may be used in combination with the operation of the previous fourth embodiment. That is, when the recording/reproducing process in a zone or a series of recording/reproducing processes are terminated, the number of revolutions is changed to a number of revolutions corresponding to the outermost peripheral zone in the partition wherein the head is at present and the next instruction is waited for.

A sixth embodiment of the present invention will now be described with reference to FIGS. 12 and 13.

Figure 13:
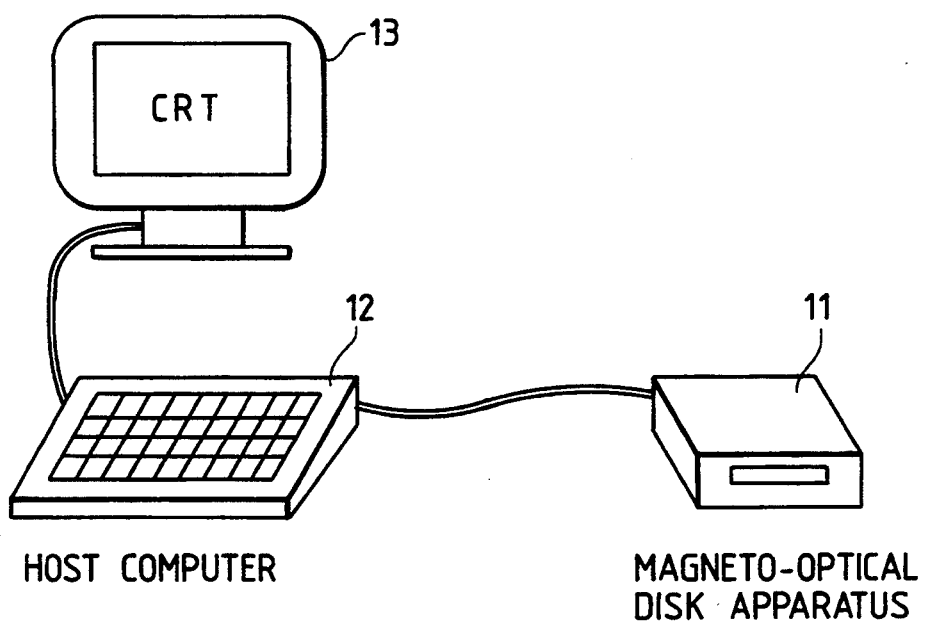
FIG. 13 is a chart showing an information recording/reproducing system in a sixth embodiment of the present invention.

In FIG. 13, the reference numeral 11 designates a magneto-optical disk apparatus, the reference numeral 12 denotes a host computer for controlling the magneto-optical disk apparatus 11, and the reference numeral 13 designates a display such as a CRT. The interior of the magneto-optical disk apparatus is of such a construction as shown in FIG. 1.

The operation in the above-described construction will hereinafter be described.

Usually, the system as shown in FIG. 13 is used in a mode for effecting the search for information stored in a recording medium in the magneto-optical disk apparatus and a mode for effecting the recording/reproduction of information on the recording medium in the magneto-optical disk apparatus, and with this point taken into account, the present invention makes the search mode and the recording/reproducing mode selectively changeable over by the host computer 12 on the basis of the user's judgment. When the user selects the search mode, an instruction therefor goes from the host computer 12 to the CPU 8 of the magneto-optical disk apparatus 11, and in the CPU 8, the spindle motor 2 is first rotated at the number of revolutions corresponding to the outermost peripheral zone in the partition wherein search information exists, and then, when there is an instruction for seeking and search coming from the host computer 12, whether the position to be sought is the outermost peripheral zone in the partition is determined. If the position is the outermost peripheral zone, the instruction is executed without the number of revolutions being changed. If the position is any other zone than the outermost peripheral zone, whether the amount of information to be searched next is equal to or greater than the predetermined amount (the amount of information prescribed by the aforementioned equation (1)) is determined. If it is smaller than the predetermined amount, the instruction is also executed without the number of revolutions being changed. If the amount of information is equal to or greater than the predetermined amount, the number of revolutions is revved up to the number of revolutions corresponding to the zone to be sought and the instruction is executed. Thereafter, the number of revolutions of the spindle motor 2 is restored to the number of revolutions corresponding to the outermost peripheral zone in the partition, and an instruction is waited for (see the flow chart of FIG. 5).

When the recording/reproducing mode is selected, an instruction therefor goes from the host computer 12 to the CPU 8 of the magneto-optical disk apparatus 11, and in the CPU 8, when an instruction for seeking and recording/reproducing comes from the host computer 12, whether the instruction is for the seeking to the inner peripheral zone of the disk or not (the same zone or the outer peripheral zone) is determined. If the instruction is for the seeking to the inner peripheral zone, whether the amount of information to be recorded/reproduced is equal to or greater than the predetermined amount (the amount of information prescribed by the aforementioned equation (1)) is determined. If the amount of information to be recorded/reproduced is equal to or greater than the predetermined amount, the switch 3 is controlled to rev up the number of revolutions of the spindle motor 2 to the number of revolutions corresponding to the zone to be sought and at the same time, seeking is executed and recording/reproduction is effected. Thereafter, an instruction is waited for at that number of revolutions. If the amount of information is smaller than the predetermined amount, seeking is executed without the number of revolutions of the spindle motor 2 being changed and the switch 4 is controlled to change the recording/reproducing frequency of the signal processing circuit 7 so that in the zone to be sought, the length of recording pit may become the same as that length of recording pit in the other zones even if recording/reproduction is effected at that number of revolutions, and recording/reproduction is effected. Thereafter, an instruction is waited for at that number of revolutions.

When seeking is effected in the same zone and recording/reproduction is effected, the number of revolutions of the spindle motor 2 and the recording/reproducing frequency of the signal processing circuit are not changed. Also, when seeking is effected to the outer peripheral zone and recording/reproduction is effected, the switch 3 is controlled to change the number of revolutions of the spindle motor 2 to the number of revolutions for the corresponding zone and the recording/reproducing frequency of the signal processing circuit is not changed (see the flow chart of FIG. 5).

Figure 2:
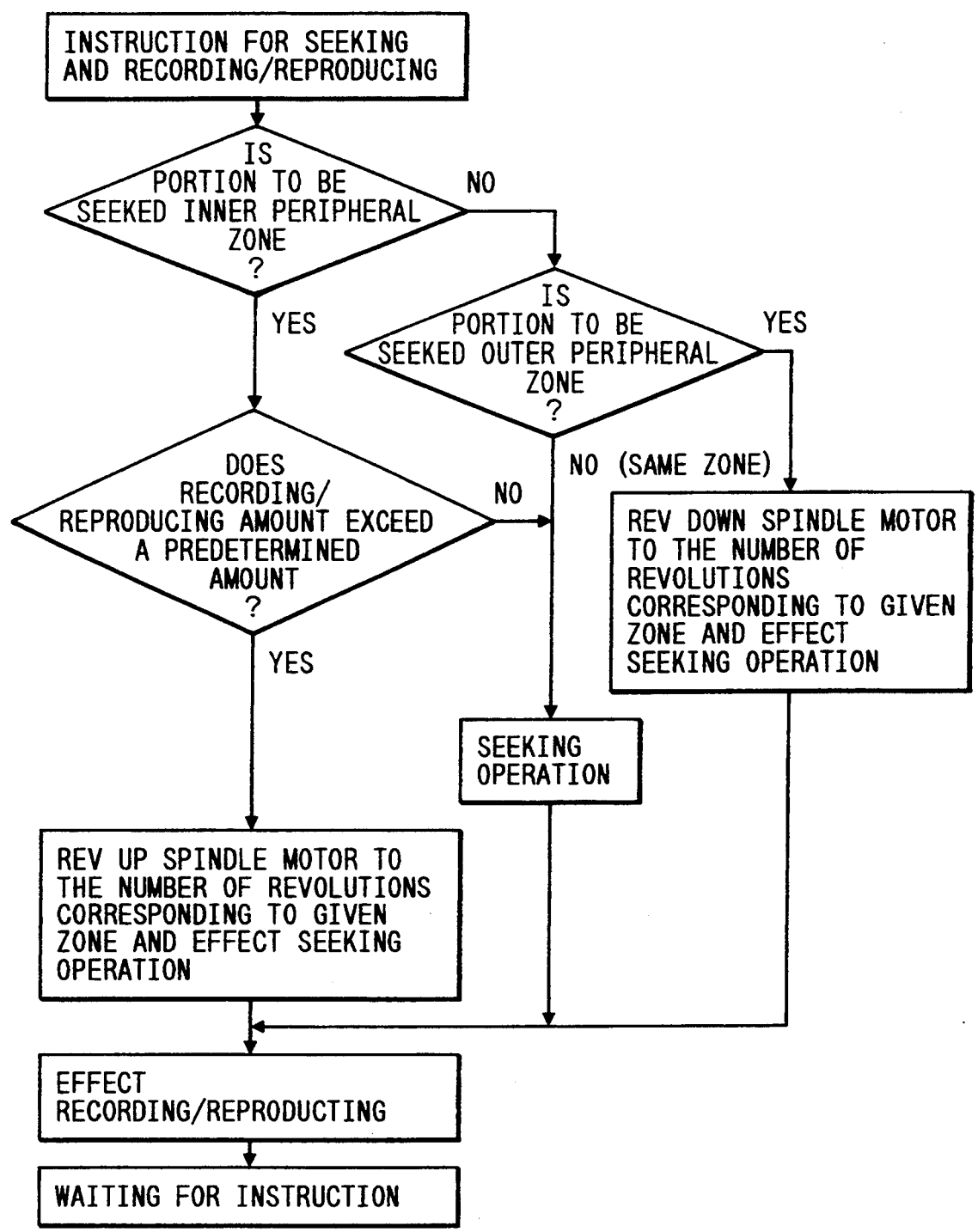
FIG. 2 is a flow chart showing a first embodiment of the present invention.
Figure 5:
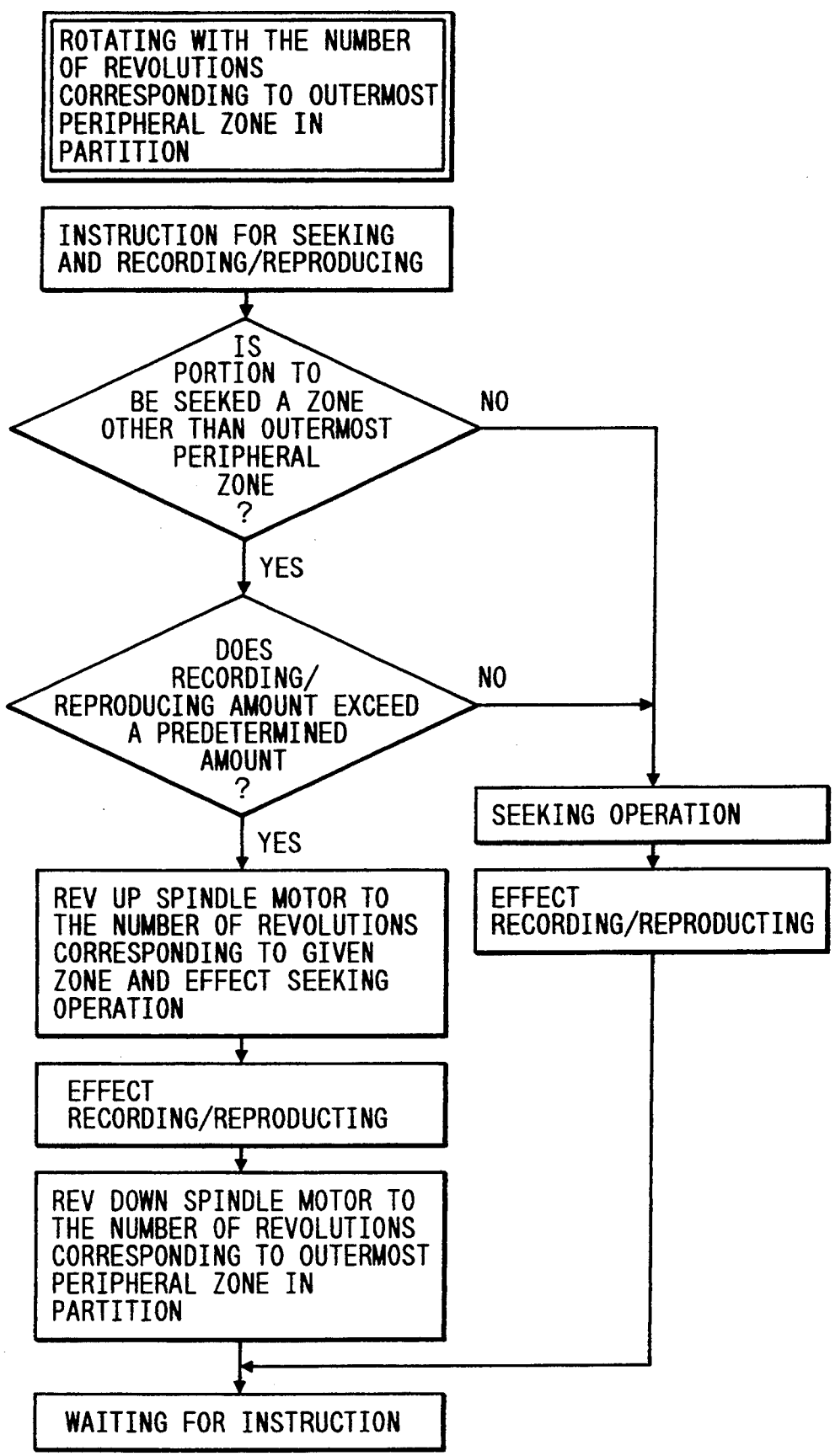
FIG. 5 is a flow chart showing a fourth embodiment of the present invention.

As described above, in the search mode, the file of a small amount of reproduction is frequently accessed beyond the zone and therefore, the control system shown in the flow chart of FIG. 5 is effective, and in the recording/reproducing mode, recording/reproduction is continuously effected and therefore, the control system shown in the flow chart of FIG. 2 is effective. In the present invention, the selection of these modes is not determined by the CPU 8 of the magneto-optical disk apparatus 11, but the modes are changed over on the basis of the user's judgment and therefore, it becomes possible to shorten the processing time.

A seventh embodiment of the present invention will now be described with reference to the flow chart of FIG. 14.

In the control method based on the flow chart of FIG. 2, seeking is effected from the zone A in which the head is at present to the zone B more inner than the zone A and further, when the amount of information to be recorded/reproduced is smaller than the predetermined amount, the instruction is executed without the number of revolutions of the spindle motor 2 being changed, and even if thereafter an instruction for recording/reproducing an amount of information equal to or greater than the predetermined amount comes into the same zone B, the instruction is executed without the number of revolutions of the spindle motor 2 being changed.

In the present invention, however, when an instruction for effecting recording/reproduction in the same zone has come after seeking is effected to the inner peripheral zone and the recording/reproduction of an amount of information smaller than the predetermined amount is effected without the number of revolutions being changed, if the amount of information to be recorded/reproduced is equal to or greater than the predetermined amount (the amount of information prescribed by the aforementioned equation (1)), the number of revolutions of the spindle motor 2 is revved up and recording/reproduction is effected. As a result, the processing time is shortened even further.

Besides, the present invention permits various applications without departing the scope of the invention as defined in the appended claims.

As described above, according to the present invention, there can be provided an information recording/reproducing method in which recording density is made constant in the inner and outer peripheral portions of a disk and the transfer speed of reproduced data is constant in the inner and outer peripheral portions of the disk, and a long seeking time is not required.

TABLE 1

3.5-inch disk format
(1) Sector size 512 Byte/Sector
Recording sign (1.7) RLL
Track pitch 1.4 μm

| Zone | Corresponding frequency | Block | Radial [mm] | Pit [μm] | Tr/Block | Scct/Block | Scct/Tr | [MB/S] |
|---|---|---|---|---|---|---|---|---|
| C | 3600 rpm | 8 | 24.0000–25.0008 | 0.73865 | 714 | 31416 | 11 | 1.3517 |
|   |          | 7 | 25.0008–27.5012 | 0.73699 | 1786 | 87514 | 19 | 1.5053 |
| B | 3000 rpm | 6 | 27.5012–30.0016 | 0.73563 | 1786 | 96444 | 54 | 1.3824 |
|   |          | 5 | 30.0016–32.5020 | 0.73450 | 1786 | 105374 | 59 | 1.5104 |
| A | 2400 rpm | 4 | 32.5020–35.0024 | 0.73355 | 1786 | 114304 | 64 | 1.3107 |
|   |          | 3 | 35.0024–77.5028 | 0.73274 | 1786 | 123234 | 69 | 1.4131 |
|   |          | 2 | 37.5028–40.0032 | 0.73203 | 1786 | 132164 | 74 | 1.5155 |
|   |          | 1 | –41.0000 |  | 712 | 52688 | 1 | 1 |

What is claimed is:

1. An information recording and/or reproducing method in which a recording area is divided into a plurality of zones in the radial direction of a disk so that the lengths of recording pits become the same in the entire recording area of the disk and the recording and/or reproduction of information is effected with a number of revolutions of the disk changed in each zone from an inner peripheral zone toward an outer peripheral zone, including the step of:

effecting the recording or reproduction of the information without changing the number of revolutions if the amount of information to be recorded or reproduced is smaller than a predetermined amount after a recording and/or reproducing head performs a seeking operation from a zone in which the recording and/or reproducing head is in a standby state to a different zone to effect the recording or reproduction operation.

2. An information recording and/or reproducing method according to claim 1, wherein the number of revolutions becomes greater from the outer peripheral zone toward the inner peripheral zone.

3. An information recording and/or reproducing method according to claim 2, wherein the predetermined amount is the amount of information to be recorded or reproduced when a total of a time during which the number of revolutions is changed to a number of revolutions corresponding to a zone to be sought and a time required for recording or reproducing at the changed number of revolutions coincides with a total of an average seeking time and the time required for recording or reproducing at a number of revolutions for a previous zone.

4. An information recording and/or reproducing method in which a recording area is divided into a plurality of zones in the radial direction of a disk so that the lengths of recording pits become the same in the entire recording area of the disk and the recording and/or reproduction of information is effected with a number of revolutions of the disk changed in each zone from an inner peripheral zone toward an outer peripheral zone, including the step of:

effecting a recording or reproduction operation in a zone while the number of revolutions of the disk equals a predetermined number of revolutions needed to record or reproduce the information in that zone, when the frequency of seeking that zone, to perform the recording or reproducing operation, exceeds a predetermined value for a past predetermined number of seeking operations.

5. An information recording and/or reproducing method according to claim 4, wherein the number of revolutions becomes greater from the outer peripheral zone toward the inner peripheral zone.

6. An information recording and/or reproducing method according to claim 4, wherein the frequency of recording or reproduction is directed to only recording or reproduction in which the amount to be recorded or reproduced is equal to or smaller than a predetermined amount.

7. An information recording and/or reproducing method in which a recording area is divided into a plurality of zones in the radial direction of a disk so that the lengths of recording pits become the same in the entire recording area of the disk and the recording and/or reproduction of information is effected with a number of revolutions of the disk changed in each zone from an inner peripheral zone toward an outer peripheral zone, including the step of:

effecting a recording or reproduction operation in a zone while the disk rotates a predetermined number of revolutions needed to record or reproduce the information in that zone, when the recording or reproduction operation in that zone has been effected a predetermined number of times of seeking of that zone.

8. An information recording and/or reproducing method according to claim 7, wherein a frequency of the continuance of the recording or reproduction is directed to only recording or reproduction operations in which an amount of information to be recorded or reproduced is equal to or smaller than a predetermined amount of information.

9. An information recording and/or reproducing method according to claim 8, wherein the number of revolutions becomes greater from the outer peripheral zone toward the inner peripheral zone.

10. An information recording and/or reproducing method according to claim 7, wherein the number of revolutions becomes greater from the outer peripheral zone toward the inner peripheral zone.

11. An information recording and/or reproducing method in which a recording area is divided into a plurality of zones in the radial direction of a disk so that the lengths of recording pits become the same in the entire recording area of the disk and the recording and/or reproduction of information is effected with a number of revolutions of the disk changed in each zone from an inner peripheral zone toward an outer peripheral zone, including the step of:

recording, when the recording area is divided into a plurality of partitions including the plurality of zones, managed information of each partition in the innermost peripheral zone in the partition, and effecting the recording or reproduction of the information without changing the number of revolutions of the disk between the zone having the managed information recorded therein and the other zones when recording or reproduction in the partition is effected.

12. An information recording and/or reproducing method in which a recording area is divided into a plurality of zones in the radial direction of a disk so that the lengths of recording pits become the same in the entire recording area of the disk and the recording and/or reproduction of information is effected with a number of revolutions of the disk changed in each zone from an inner peripheral zone toward an outer peripheral zone, including the step of:

dividing the recording area into a plurality of partitions including the plurality of zones, and changing, after continuous recording or reproduction processes for a zone in a partition are completed, the number of revolutions of the disk to a predetermined number of revolutions needed to record or reproduce the information in the outermost peripheral zone in that partition.

13. An information recording and/or reproducing method according to claim 12, further wherein when an amount of information equal to or greater than a predetermined amount is continuously recorded or reproduced in the partition, the number of revolutions is not changed to a number of revolutions corresponding to the outermost peripheral zone in the partition even if the recording or reproduction of a bit of information in that partition is completed.

14. An information recording and/or reproducing method in which a recording area is divided into a plurality of zones in the radial direction of a disk so that the lengths of recording pits become the same in the entire recording area of the disk and the recording and/or reproduction of information is effected with a number of revolutions of the disk changed in each zone from an inner peripheral zone toward an outer peripheral zone, including the step of:

effecting the recording or reproduction of the information without changing the number of revolutions, the recording or reproduction of the information without changing the number of revolutions if the amount of information to be next recorded or reproduced is smaller than a predetermined amount when a seeking operation of a recording and/or reproducing head is effected from a zone in which the recording and/or reproducing head is in a standby state to the inner peripheral zone, effecting the recording or reproduction of the information without changing the number of revolutions when the next recording or reproduction is effected in the same zone, and effecting the recording or reproduction of the information with the number of revolutions changed to a number of revolutions corresponding to that zone if the amount of information to be recorded or reproduced is greater than the predetermined amount.

15. An information and/or reproducing method according to claim 14, wherein the number of revolutions becomes greater from the outer peripheral zone toward the inner peripheral zone.

16. An information recording and/or reproducing method according to claim 14, wherein the predetermined amount is the amount of information to be recorded or reproduced when a total of a time during which the number of revolutions is changed to a number of revolutions corresponding to a zone to be sought and a time required for recording or reproducing at the changed number of revolutions coincides with a total of an average seeking time and the time required for recording or reproducing at a number of revolutions for a previous zone.

17. An information recording and/or reproducing method in which a recording area is divided into a plurality of zones and a plurality of partitions including said zones in the radial direction of a disk so that the lengths of recording pits become the same in the entire recording area of the disk and the recording and/or reproduction of information is effected with a number of revolutions of the disk changed in each zone from an inner peripheral zone toward an outer peripheral zone, including the steps of:

a first control step including the following operations:
(1) effecting the recording or reproduction of the information without changing the number of revolutions if the amount of information to be recorded or reproduced is smaller than a predetermined amount when a seeking operation of a recording and/or reproducing head is effected from a zone in which the recording and/or reproducing head is in a standby state to the inner peripheral zone to effect recording or reproduction, effecting the recording or reproduction of the information with the number of revolutions increased to a number of revolutions corresponding to the zone to be sought if the amount of information to be recorded or reproduced is greater than the predetermined amount and thereafter waiting for the next recording or reproduction at the number of revolutions during recording or reproduction;

(2) effecting recording or reproduction without changing the previous number of revolutions when the recording or reproducing operation is to be performed in the zone wherein the recording and/or reproducing head is in a standby state, and waiting for the next recording or reproduction at the number of revolutions during recording or reproduction after the termination of a series of recording or reproducing operations;

(3) effecting the recording or reproduction of the information with the number of revolutions decreased to a number of revolutions corresponding to the zone to be sought when a seeking operation of the recording and/or reproducing head is effected from the zone in which the recording and/or reproducing head is in the standby state to the outer peripheral zone to effect recording or reproduction, and waiting for the next recording or reproduction at the number of revolutions during recording or reproduction after the termination of the series of recording or reproducing operations;

a second control step including the following operations:

first, adopting the number of revolutions for the outermost peripheral zone in the partition wherein a reproducing head lies now;

effecting the reproduction of the information without changing the number of revolutions if the amount of information to be reproduced is smaller than a predetermined amount when seeking is effected from a zone in the partition wherein the reproducing head is in a standby state to a different zone to effect reproduction, effecting the reproduction of the information with the number of revolutions increased to a number of revolutions corresponding to the zone to be sought if the amount of information to be reproduced is greater than the predetermined amount, and thereafter waiting for the next reproduction with the number of revolutions decreased to a number of revolutions corresponding to the outermost peripheral zone in the partition;

effecting the reproduction of the information without changing the number of revolutions if the amount of information to be reproduced is smaller than a predetermined amount when the reproducing operation is performed in the zone, effecting the reproduction of the information with the number of revolutions increased to a number of revolutions corresponding to the zone if the amount of information to be reproduced is greater than the predetermined amount, and waiting for the next reproduction with the number of revolutions decreased to a number of revolutions corresponding to the outermost peripheral zone in the partition after the termination of a series of reproducing operations;

effecting the reproducing operation without changing the number of revolutions when seeking is effected from the zone in which the reproducing head is in a standby state to the outer peripheral zone to effect reproduction, and waiting for the next reproduction at a number of revolutions corresponding to the outermost peripheral zone in the partition after the termination of the series of reproducing operations; and the step of changing over said first control step and said second control step in conformity with the situation.

* * * * *

UNITED STATES PATENT AND TRADEMARK OFFICE
CERTIFICATE OF CORRECTION

PATENT NO. : 5,394,387  Page 1 of 2
DATED : February 28, 1995
INVENTOR(S) : YOSHIHIKO WATANABE It is certified that error appears in the above-indentified patent and that said Letters Patent is hereby corrected as shown below:

In the Drawing:

SHEET 2 OF THE DRAWINGS:

FIGURE 2

"SEEKED" (both occurrences) should read --SOUGHT--.

"RECORDING/REPRODUCTING" should read --RECORDING/REPRODUCING--.

SHEET 3 OF THE DRAWINGS:

FIGURE 3

"RECORDING/REPRODUCTING" should read --RECORDING/REPRODUCING--.

SHEET 4 OF THE DRAWINGS:

FIGURE 4

"RECORDING/REPRODUCTING" should read --RECORDING/REPRODUCING--.

SHEET 5 OF THE DRAWINGS:

FIGURE 5

"SEEKED" should read --SOUGHT--.

"RECORDING/REPRODUCTING" (both occurrences) should read --RECORDING/REPRODUCING--.

UNITED STATES PATENT AND TRADEMARK OFFICE
CERTIFICATE OF CORRECTION

PATENT NO. : 5,394,387                    Page 2 of 2

DATED : February 28, 1995

INVENTOR(S) :
YOSHIHIKO WATANABE

Figure 14:
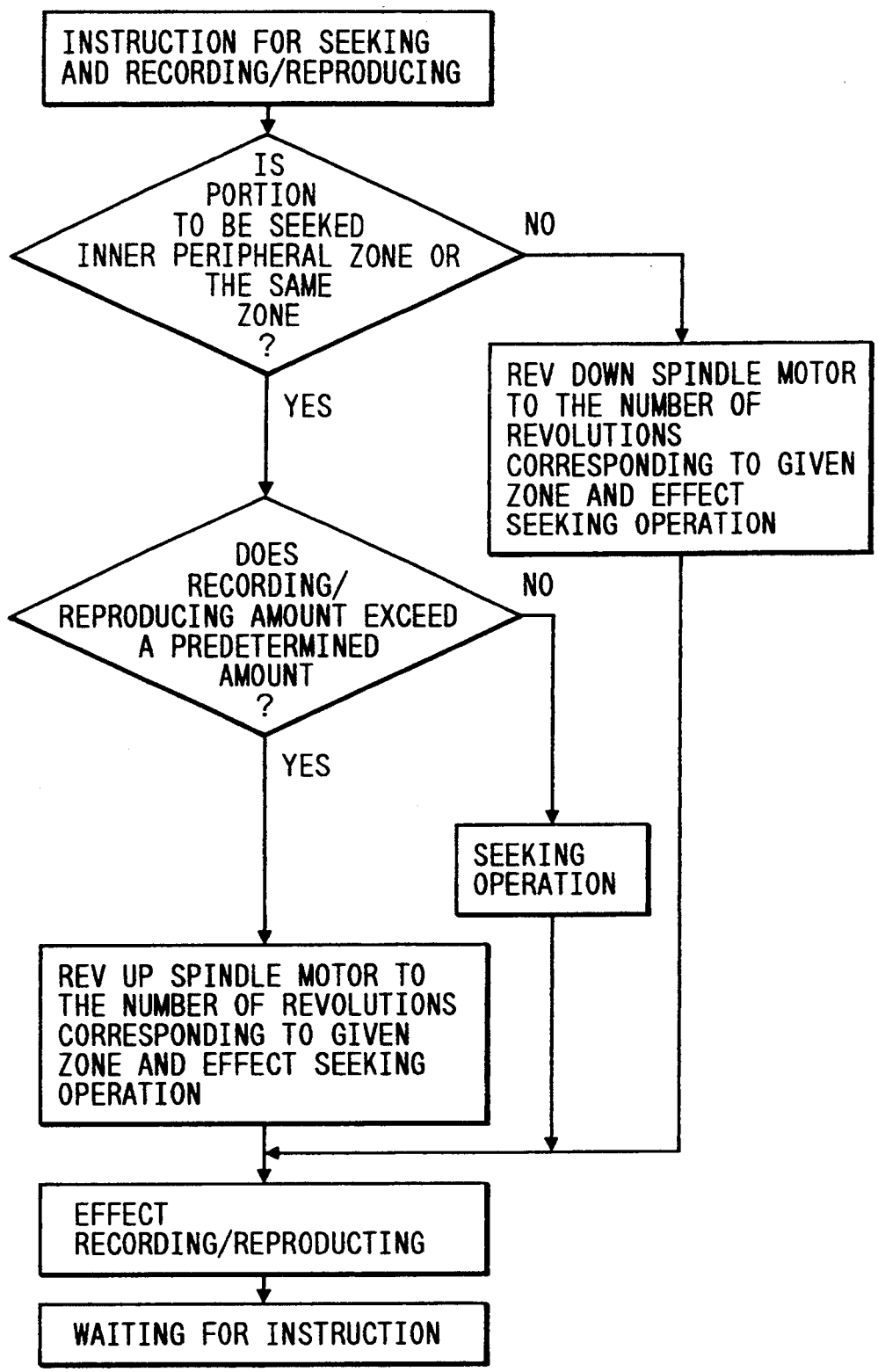
FIG. 14 is a flow chart showing a seventh embodiment of the present invention.

It is certified that error appears in the above-indentified patent and that said Letters Patent is hereby corrected as shown below:

SHEET 11 OF THE DRAWINGS:

FIGURE 14,
"SEEKED" should read --SOUGHT--.
"RECORDING/REPRODUCTING" should
read --RECORDING/REPRODUCING--.

COLUMN 3:
Line 68, "comprises" should read --comprises:--.

COLUMN 11:
Line 17, "regions" should read --region--.

Signed and Sealed this

Sixth Day of June, 1995

Attest:

BRUCE LEHMAN

*Attesting Officer*          *Commissioner of Patents and Trademarks*